(12) United States Patent
Umeda

(10) Patent No.: US 8,897,354 B2
(45) Date of Patent: Nov. 25, 2014

(54) RECEIVER APPARATUS, METHOD FOR PROCESSING RECEIVED SIGNAL AND COMPUTER PROGRAM PRODUCT

(71) Applicant: Fujitsu Limited, Kawasaki-shi, Kanagawa (JP)

(72) Inventor: Masataka Umeda, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/055,212

(22) Filed: Oct. 16, 2013

(65) Prior Publication Data

US 2014/0192854 A1 Jul. 10, 2014

(30) Foreign Application Priority Data

Jan. 9, 2013 (JP) .................. 2013-001897

(51) Int. Cl.
  *H03H 7/30* (2006.01)
  *H04B 1/10* (2006.01)
  *H04L 25/03* (2006.01)
  *H04L 25/02* (2006.01)

(52) U.S. Cl.
  CPC ...... *H04L 25/03885* (2013.01); *H04L 25/0216* (2013.01)
  USPC .......................................... 375/232; 375/350

(58) Field of Classification Search
  CPC ................ H04L 25/03057; H04L 2025/0349; H04L 25/0212; H04L 2025/03503; H04L 27/01; H04L 25/022; H04L 2025/03471; H04L 25/03044; H04L 2025/03579; H04L 25/0307; H04L 25/0202; H04L 25/03063; H04L 25/03133; H04L 25/03159
  USPC .......................................... 375/232–236, 350
  See application file for complete search history.

(56) References Cited

U.S. PATENT DOCUMENTS

| 2005/0084046 A1* | 4/2005 | Seo ................................ 375/350 |
| 2005/0186933 A1* | 8/2005 | Trans ............................. 455/296 |
| 2008/0107168 A1* | 5/2008 | Xia et al. ...................... 375/233 |
| 2014/0105268 A1* | 4/2014 | Eliaz ............................. 375/233 |

FOREIGN PATENT DOCUMENTS

| JP | 06-268540 A | 9/1994 |
| JP | 2008-219517 A | 9/2008 |

OTHER PUBLICATIONS

Takaoka, et al., "Adaptive Prediction Iterative Channel Estimation for OFDM Signal Reception in a Frequency Selective Fading Channel," Technical Report of IEICE, pp. 65-70, Aug. 2002.

* cited by examiner

Primary Examiner — Don N Vo
(74) Attorney, Agent, or Firm — Arent Fox LLP

(57) ABSTRACT

A reception apparatus includes: a Fourier transform unit to output a converted signal; a propagation path estimation unit to calculate propagation-path-estimated-values based on pilot subcarriers; and a propagation path compensation unit, including a filter, to compensate propagation path distortion, the filter includes: first multipliers to multiply the propagation-path-estimated-values of taps other than a center tap by filtering coefficients; a first adder to add outputs of the first multipliers; a first subtractor to calculate an error between an output of the first adder and a propagation-path-estimated-value of the center tap; a filtering coefficient generation unit to generate the filtering coefficients based on the error; a second multiplier to multiply the propagation-path-estimated-value of the center tap by first coefficient; a third multiplier to multiply the output of the first adder by second coefficient; and a second adder to add an output of the second multiplier and an output of the third multiplier.

20 Claims, 11 Drawing Sheets

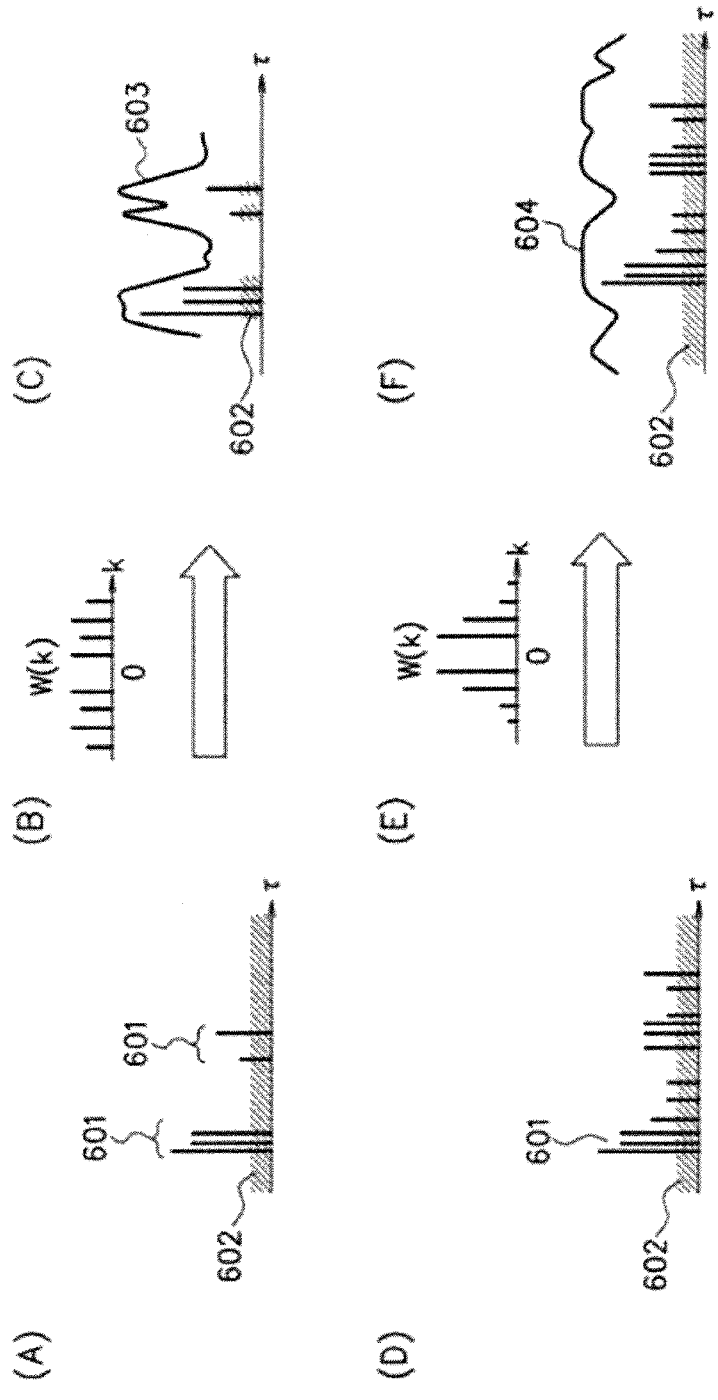

RECEIVER APPARATUS, METHOD FOR PROCESSING RECEIVED SIGNAL AND COMPUTER PROGRAM PRODUCT

CROSS-REFERENCE TO RELATED APPLICATION

This application is based upon and claims the benefit of priority of the prior Japanese Patent Application No. 2013-001897, filed on Jan. 9, 2013, the entire contents of which are incorporated herein by reference.

FIELD

The embodiments discussed herein are related to a receiver apparatus, a method for processing a received signal and a computer program product.

BACKGROUND

As an adaptive prediction filter, a Viterbi equalizer that iteratively performs generation of a replica, calculation of a phase error, and estimation of a channel impulse response vector on received sample data is used.

The iterative channel estimation method is applied to orthogonal frequency-division multiplexing (OFDM) reception.

Examples of the related art are disclosed in Japanese Laid-open Patent Publication No. 6-268540 and Shinsuke Takaoka and Fumiyuki Adachi "Adaptive Prediction Iterative Channel Estimation for OFDM Signal Reception in a Frequency Selective Fading Channel", Technical Report of IEICE, RCS2002-157, pp. 65-70, August 2002.

SUMMARY

According to one aspect of the embodiments, a reception apparatus includes: a Fourier transform unit configured to output a converted signal obtained by converting a received signal from a time domain into a frequency domain; a propagation path estimation unit configured to calculate propagation path estimated values based on pilot subcarriers included in the converted signal; and a propagation path compensation unit, including a filter that filters the propagation path estimated values, configured to compensate propagation path distortion in the converted signal, wherein the filter includes: a plurality of first multipliers configured to multiply the propagation path estimated values corresponding to a plurality of taps other than a center tap, respectively, by filtering coefficients; a first adder configured to add output values of the plurality of first multipliers; a first subtractor configured to calculate an error between an output value of the first adder and a propagation path estimated value corresponding to the center tap; a filtering coefficient generation unit configured to generate the filtering coefficients based on the error; a second multiplier configured to multiply the propagation path estimated value corresponding to the center tap by a first coefficient; a third multiplier configured to multiply the output value of the first adder by a second coefficient; and a second adder configured to add an output value of the second multiplier and an output value of the third multiplier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B illustrate examples of a path profile.

DESCRIPTION OF EMBODIMENT

In generation of a replica, a transversal filter is used. A corrected replica is generated by controlling a tap phase of the transversal filter using an adaptive algorithm such that an estimated phase error between received sample data and the replica becomes minimal. In estimation of the phase error, a residual phase error is calculated based on a difference between the generated corrected replica and the received sample data. The correction of the replica and the estimation of the phase error are repeated so that the residual phase error becomes minimal. The accuracy for estimating a channel impulse response vector with which the error between the received sample data and the replica becomes minimal improves.

In iterative channel estimation of OFDM signal reception, an adaptive prediction filter is introduced, and tap coefficients are adaptively updated in accordance with changes in a propagation environment. In initial channel estimation, channel estimation is performed by interpolation and extrapolation of pilot subcarriers which are distributed among subcarriers. In second and later channel estimation, channel estimation is performed by controlling taps of the adaptive prediction filter such that an error between a replica signal subjected to inverse modulation based on symbol decision information regarding a received signal and an output signal of the adaptive prediction filter becomes minimal. Adaptive prediction control is performed with a center tap of the adaptive prediction filter removed in consideration of correlation between the replica signal and an input signal of the predictive prediction filter.

In a reception apparatus, propagation path distortion in a received signal is compensated. In the compensation of propagation path distortion, the accuracy of the compensation might deteriorate due to multipath effects of a propagation path.

Figure 1:
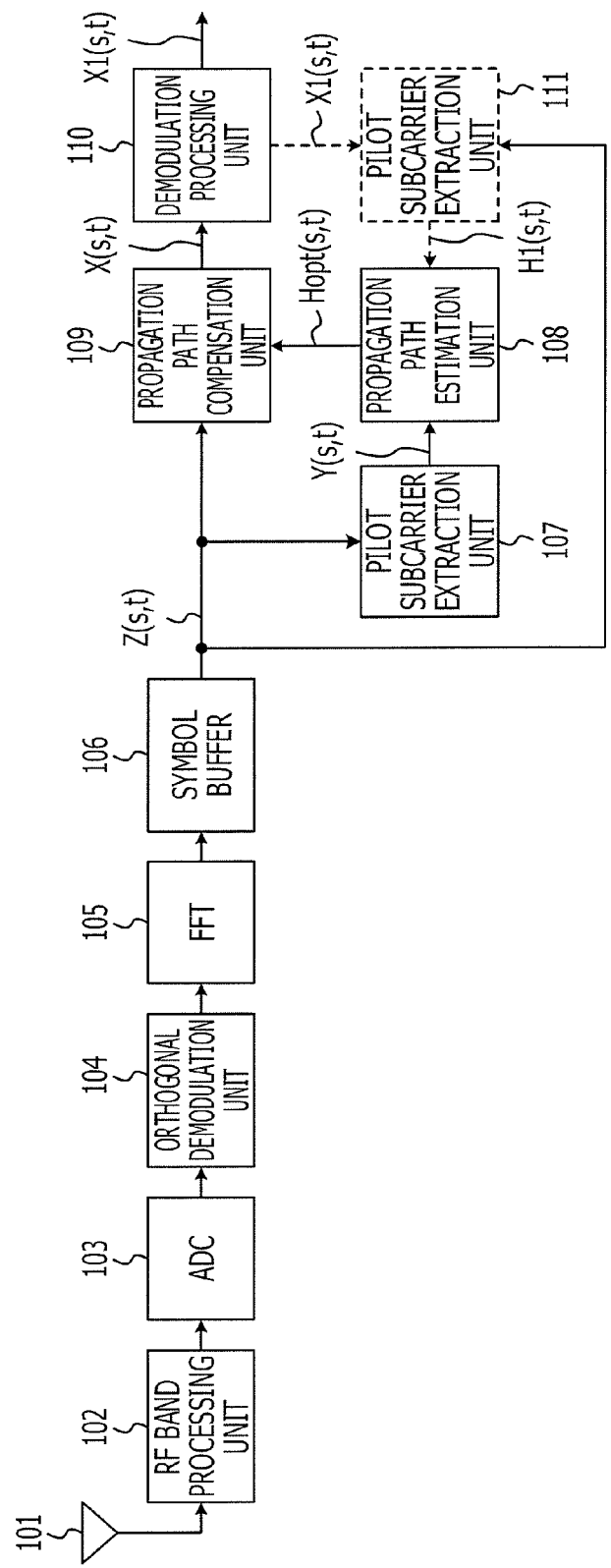
FIG. 1 illustrates an example of a reception apparatus.

FIG. 1 illustrates an example of a reception apparatus. The reception apparatus may be, for example, an OFDM signal reception apparatus. A radio frequency (RF) band processing unit 102 receives a radio OFDM reception signal through an antenna 101, and performs a down-convert process, signal amplification, or a filtering process in an RF band. An analogto-digital converter 103 converts an analog output signal of the RF band processing unit 102 into a digital signal. An orthogonal demodulation unit 104 converts the received digital signal into I/Q signals that are orthogonal to each other. A fast Fourier transform (FFT) unit 105 converts an output signal of the orthogonal demodulation unit 104 from a time domain into a frequency domain. A symbol buffer 106 buffers an output signal of the FFT unit 105, and outputs a signal $Z(s, t)$. s denotes a subcarrier number in a frequency direction, and t denotes an OFDM symbol number in a time direction. An OFDM signal is a signal in which a plurality of subcarriers are multiplexed in the frequency direction, and independent transmission data is stored in each subcarrier of the frequency domain signal $Z(s, t)$.

Figure 2:
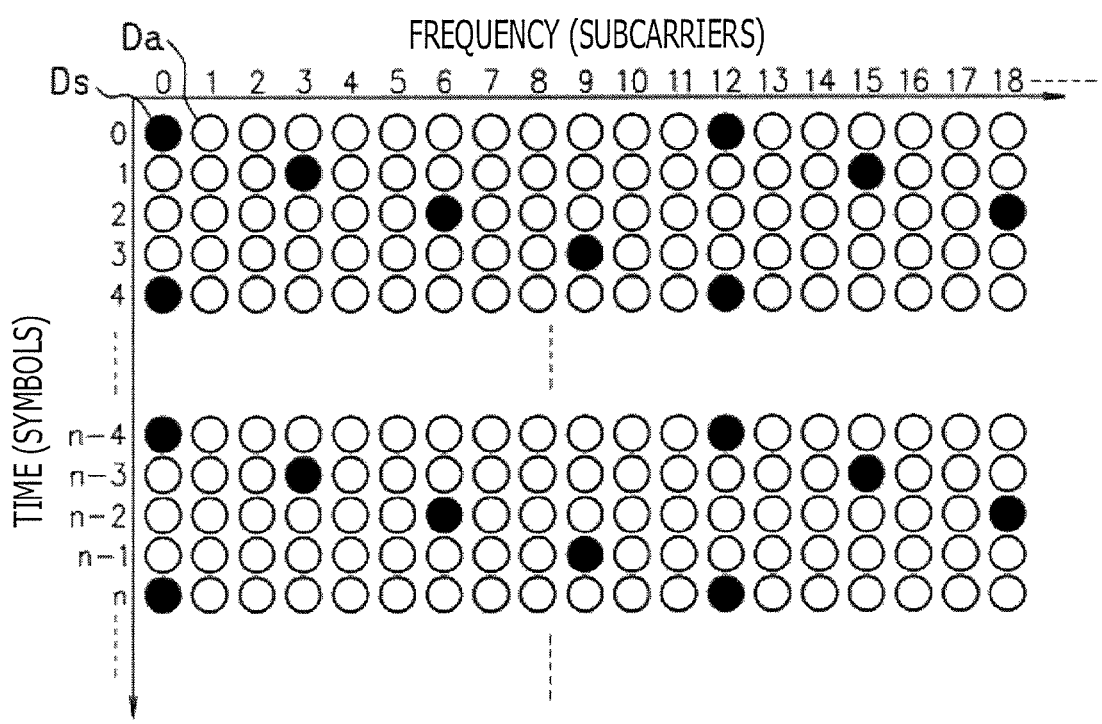
FIG. 2 illustrates an example of an OFDM frame.

FIG. 2 illustrates an example of an OFDM frame. In FIG. 2, an OFDM frame of the integrated services digital broadcasting-terrestrial (ISDB-T) is illustrated as an example of subcarrier arrangement of OFDM. A data subcarrier Da is indicated by a hollow circle, and stores data to be transmitted from a transmission apparatus to a reception apparatus. A pilot subcarrier Ds is indicated by a solid circle, and stores a known signal determined in accordance with a communication standard. In an OFDM reception apparatus, a propagation path estimated value of each pilot subcarrier Ds may be obtained by calculating the amounts of changes in the phases and the amplitudes of each pilot subcarrier Ds, which stores a known signal, and a received signal $Z(s, t)$. In the OFDM frame of the ISDB-T, an arrangement pattern called "scattered pilot symbols" is adopted in which the pilot subcarriers Ds are disposed at intervals of twelve subcarriers in the frequency direction and at intervals of three subcarriers per symbol.

When an OFDM signal, which is a frequency-multiplexed signal transmitted from a base station, for example, a transmission apparatus, is received in wireless communication, the OFDM signal transmitted from the base station is reflected and diffracted by obstructions such as buildings and topographic features. A reception apparatus receives the OFDM signal from a plurality of paths as a result of the reflection and diffraction. The plurality of paths generated by the reflection and diffraction is referred as multipath. Propagation distances of the OFDM signal in multipath are different from each other. Due to the different propagation distances, the reception apparatus receives a plurality of OFDM signals whose amplitudes and phases are different from each other. When the OFDM signal is affected by multipath, the amplitudes and the phases of the subcarriers of the OFDM signal change. In order to reduce the multipath effects upon the subcarriers, a propagation path estimation unit 108 performs a propagation path estimation process for estimating the propagation path characteristics of a received signal.

A reception apparatus that receives an OFDM signal uses the pilot subcarriers Ds which are dispersed and inserted into the OFDM signal in the propagation path estimation process. The pilot subcarriers Ds each include an amplitude value and a phase predetermined in a communication specification. The reception apparatus estimates a propagation path estimated value of the position of a received pilot subcarrier Ds by comparing the received pilot subcarrier Ds with a predetermined pilot subcarrier Ds. The reception apparatus estimates propagation path estimated values of the positions of the data subcarriers Da by performing interpolation using the propagation path estimated values of the positions of the pilot subcarriers Ds.

In FIG. 1, a pilot subcarrier extraction unit 107 extracts the pilot subcarriers Ds from a received signal $Z(s, t)$, and outputs a received signal $Y(s, t)$ including the pilot subcarriers Ds.

The propagation path estimation unit 108 calculates propagation path estimated values $H(s, t)=Y(s, t)/X(s, t)$ based on the received signal $Y(s, t)$ including the pilot subcarriers Ds and a known signal $X(s, t)$ including the pilot subcarriers Ds, and then calculates propagation path estimated values $Hopt(s, t)$ in which noise has been reduced based on the propagation path estimated values $H(s, t)$. A propagation path compensation unit 109 calculates the received signal $X(s, t)=Z(s, t)/Hopt(s, t)$, compensates propagation path distortion in the received signal $Z(s, t)$, and outputs the received signal $X(s, t)$. A demodulation processing unit 110 performs a demodulation process such as an error correction process on the received signal $X(s, t)$, makes a determination as to data to be transmitted, and outputs determined values $X1(s, t)$.

Figure 3:
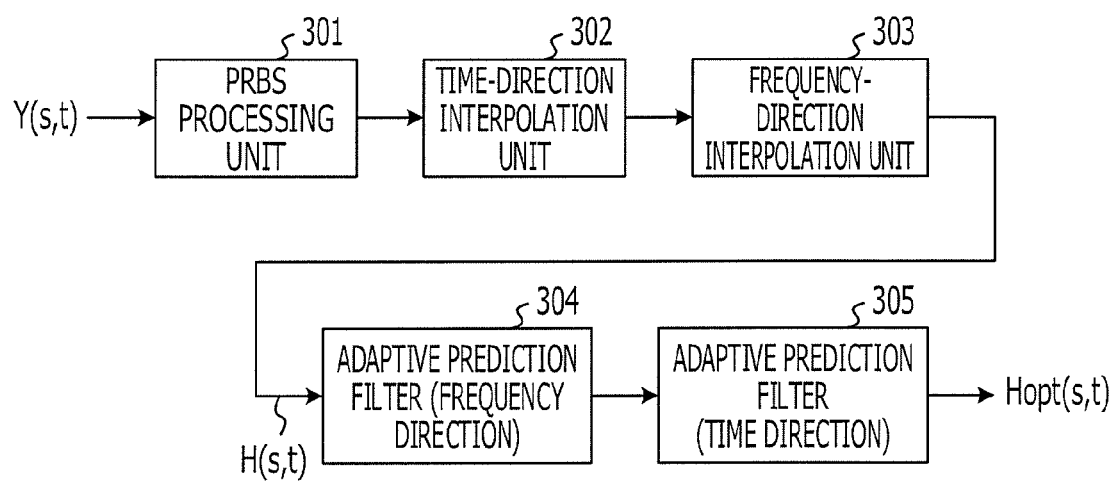
FIG. 3 illustrates an example of a propagation path estimation unit.
Figure 4:
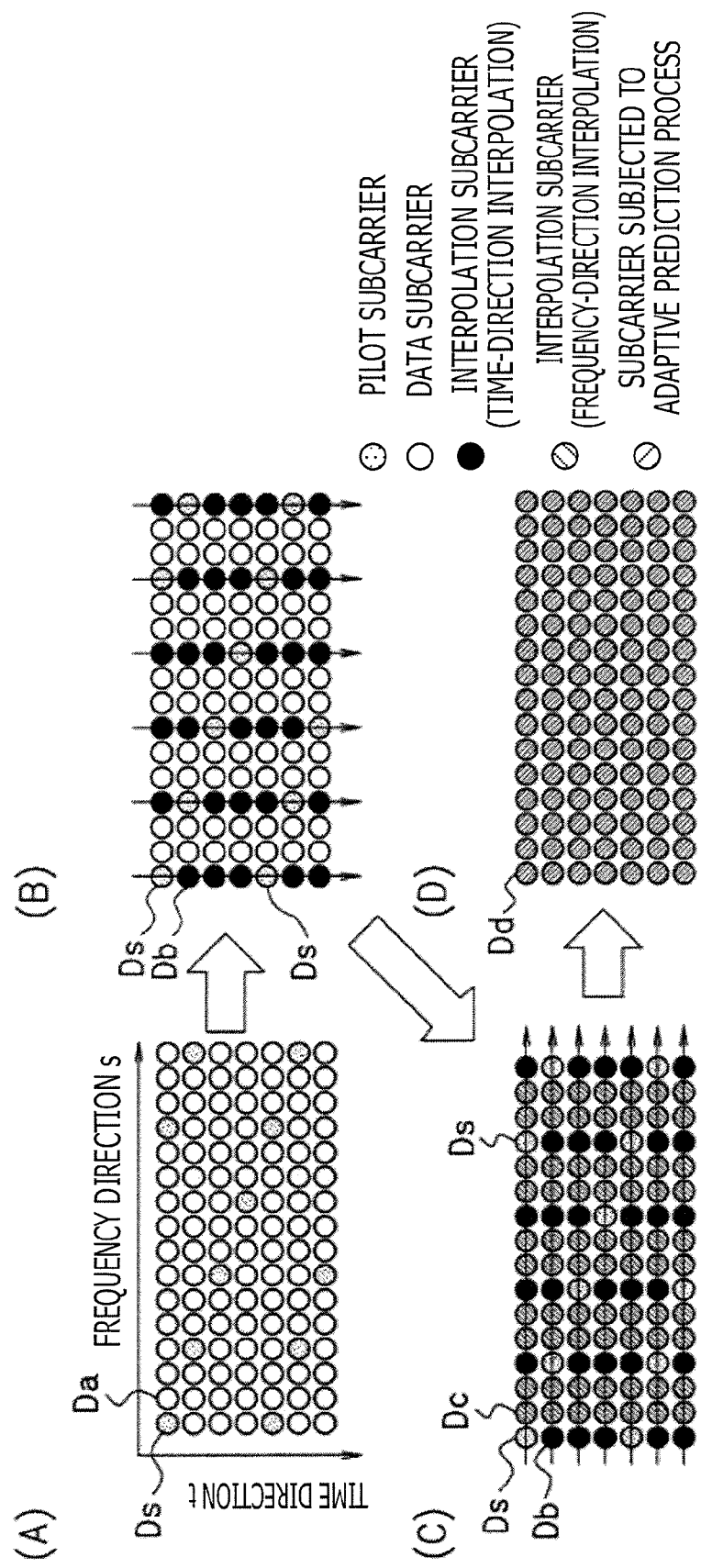
FIG. 4 illustrates an example of a process of a propagation path estimation unit.

FIG. 3 illustrates an example of a propagation path estimation unit. The propagation path estimation unit illustrated in FIG. 3 may be the propagation path estimation unit 108 illustrated in FIG. 1. FIG. 4 illustrates an example of a process performed by a propagation path estimation unit. The propagation path estimation unit 108 illustrated in FIG. 1 may perform the process illustrated in FIG. 4. The propagation path estimation unit 108 includes a pseudorandom binary sequence (PRBS) processing unit 301, a time-direction interpolation unit 302, a frequency-direction interpolation unit 303, a frequency-direction adaptive prediction filter 304, and a time-direction adaptive prediction filter 305.

The PRBS processing unit 301 calculates $Y(s, t)/X(s, t)$ based on the received signal $Y(s, t)$ including the pilot subcarriers Ds and the known signal $X(s, t)$ including the pilot subcarriers Ds, and, as illustrated in part (A) of FIG. 4, outputs propagation path estimated values of the positions of the pilot subcarriers Ds.

The time-direction interpolation unit 302 interpolates the propagation path estimated values of the positions of the pilot subcarriers Ds in the time direction, and, as illustrated in part (B) of FIG. 4, calculates propagation path estimated values of the positions of time-direction interpolation subcarriers Db.

The frequency-direction interpolation unit 303 interpolates the propagation path estimated values illustrated in part (B) of FIG. 4 in the frequency direction, and then, as illustrated in part (C) of FIG. 4, calculates propagation path estimated values of the positions of frequency-direction interpolation subcarriers Dc and outputs propagation path estimated values $H(s, t)$ $\{0 \leq s < N\}$. N denotes the number of OFDM subcarriers.

The frequency-direction adaptive prediction filter 304 filters the propagation path estimated values $H(s, t)$ illustrated in part (C) of FIG. 4 in the frequency direction, and outputs propagation path estimated values.

The time-direction adaptive prediction filter 305 filters the propagation path estimated values $H(s, t)$ output from the frequency-direction adaptive prediction filter 304 in the time direction, and, as illustrated in part (D) of FIG. 4, outputs the propagation path estimated values $Hopt(s, t)$ including subcarriers Dd obtained as a result of the adaptive prediction.

Figure 5A:
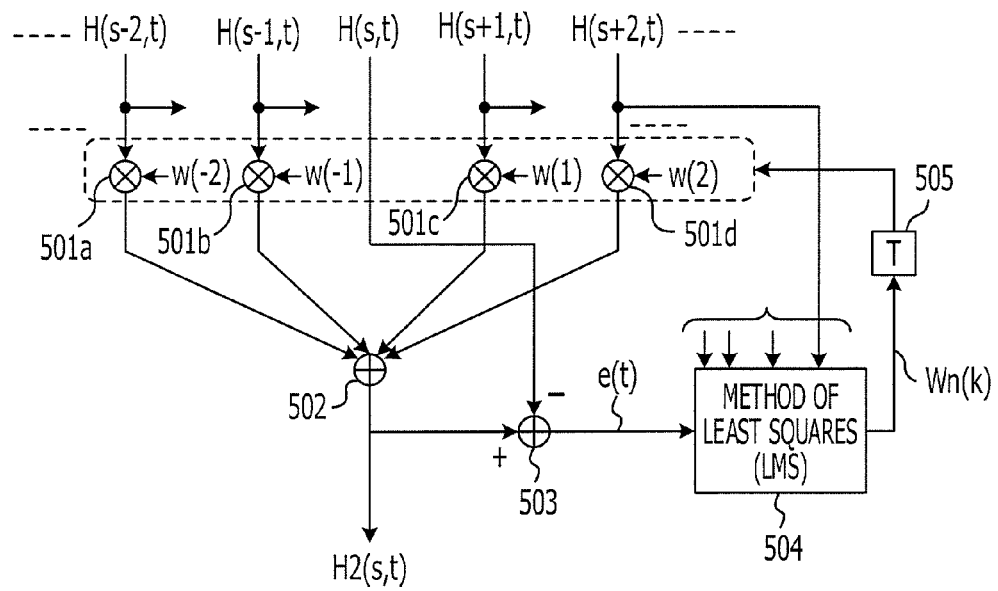
FIGS. 5A and 5B illustrate an example of an adaptive prediction filter.
Figure 5B:
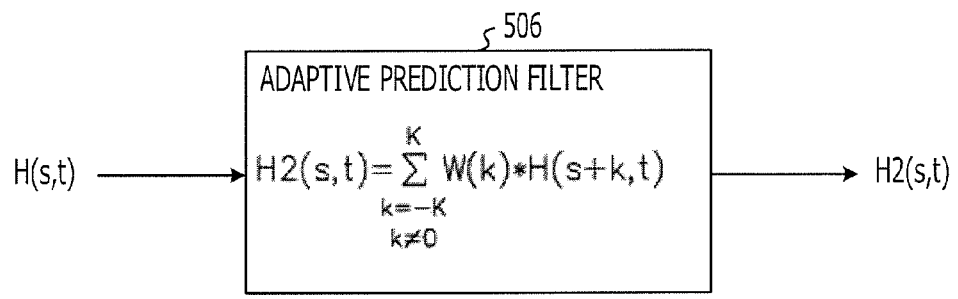

FIGS. 5A and 5B illustrate an example of an adaptive prediction filter. A frequency-direction adaptive prediction filter 506 illustrated in FIGS. 5A and 5B may correspond to the frequency-direction adaptive prediction filter 304 illustrated in FIG. 3. The adaptive prediction filter 506 illustrated in FIG. 5B includes, as illustrated in FIG. 5A, first multipliers 501a to 501d, a first adder 502, a first subtractor 503, a filtering coefficient generation unit 504, and a flip-flop 505. The adaptive prediction filter 506 receives 2K+1 propagation path estimated values $H(s+k, t)$ $\{-K < k < K\}$, and, as a result of the filtering process, outputs a propagation path estimated value H2(s, t) from which noise has been removed. Although K is 2 in FIG. 5A, K may be an arbitrary value.

The first multiplier 501a multiplies the propagation path estimated value H(s−2, t) by a filtering coefficient W(−2). The first multiplier 501b multiplies the propagation path estimated value H(s−1, t) by a filtering coefficient W(−1). The first multiplier 501c multiplies the propagation path estimated value H(s+1, t) by a filtering coefficient W(1). The first multiplier 501d multiplies the propagation path estimated value H(s+2, t) by a filtering coefficient W(2). For example, the first multipliers 501a to 501d multiply the propagation path estimated values H(s+k, t) $\{-K<k<K, k\neq 0\}$ of a plurality of taps other than a center tap by the filtering coefficients W(k). The first adder 502 adds output values of the first multipliers 501a to 501d, and outputs the propagation path estimated value H2(s, t).

As illustrated in FIG. 5B, the adaptive prediction filter 506 receives the propagation path estimated values H(s+k, t) $\{-K<k<K, k\neq 0\}$, and outputs the propagation path estimated value H2(s, t) after the filtering represented by the following expression (1) using the filtering coefficients W(k).

$$H2(s, t) = \sum_{\substack{k=-K \\ k\neq 0}}^{K} W(k)H(s + k, t) \quad (1)$$

The first subtractor 503 calculates an error e(t) between the output value H2(s, t) of the first adder 502 and the propagation path estimated value H(s, t) of the center tap by subtracting the propagation path estimated value H(s, t) of the center tap from the output value H2(s, t) of the first adder 502. For example, the propagation path estimated value H(s, t) of the center tap may be used as a reference signal. The filtering coefficient generation unit 504 receives the propagation path estimated values H(s+k, t) $\{-K<k<K, k\neq 0\}$, and generates next filtering coefficients Wn(k) based on the error e(t) using a method of least squares represented by the following expression (2). The flip-flop 505 holds the filtering coefficients Wn(k), and outputs the filtering coefficients Wn(k) to the first multipliers 501a to 501d.

$$Wn(k)=W(k)+\mu H(s+k,t)e^*(t)\{-K<k<K,k\neq 0\} \quad (2)$$

μ denotes a step response, and may be a value smaller than 1. An error e*(t) denotes a complex conjugate of the error e(t). The filtering coefficients W(k) might be updated such that the error e(t) becomes minimal, thereby improving the accuracy of the propagation path estimated value H2(s, t).

FIGS. 6A and 6B illustrate examples of a path profile. Part (A) of FIG. 6A illustrates the path profile of input propagation path estimated values H(s, t), which includes paths 601 and noise 602. Part (B) of FIG. 6A illustrates filtering coefficients W(k), and the horizontal axis represents a tap number k. The filtering coefficients W(k) include filtering coefficients W(k) of taps other than the center tap. Part (C) of FIG. 6A illustrates the path profile of an output propagation path estimated value H2(s, t). A filtering characteristic curve 603 in which the noise 602 has been reduced is obtained.

Parts (D) to (F) of FIG. 6B illustrate a filtering process performed in a multipath environment, in which delay and the number of waves are large. Since, in multipath, an electric wave (radio wave) transmitted from a transmission apparatus is reflected and diffracted by buildings and topological features and a reception apparatus receives the same electric wave from a plurality of paths (propagation paths), a plurality of paths 601 might be generated for the same electric wave. Part (D) of FIG. 6B illustrates the path profile of input propagation path estimated values H(s, t), which includes paths 601 through which a large number of waves propagate and noise 602. Part (E) of FIG. 6B illustrates filtering coefficients W(k). The filtering coefficients W(k) include filtering coefficients W(k) of taps other than the center tap. Part (F) of FIG. 6B illustrates the path profile of an output propagation path estimated value H2(s, t), and a filtering characteristic curve 604 in which the noise 602 has not been sufficiently reduced is obtained. Since the filtering coefficient of the center tap is not included in the filtering coefficients W(k) illustrated in part (E) of FIG. 6B, the noise 602 might not be sufficiently removed as illustrated in part (F) of FIG. 6B.

Figure 7A:
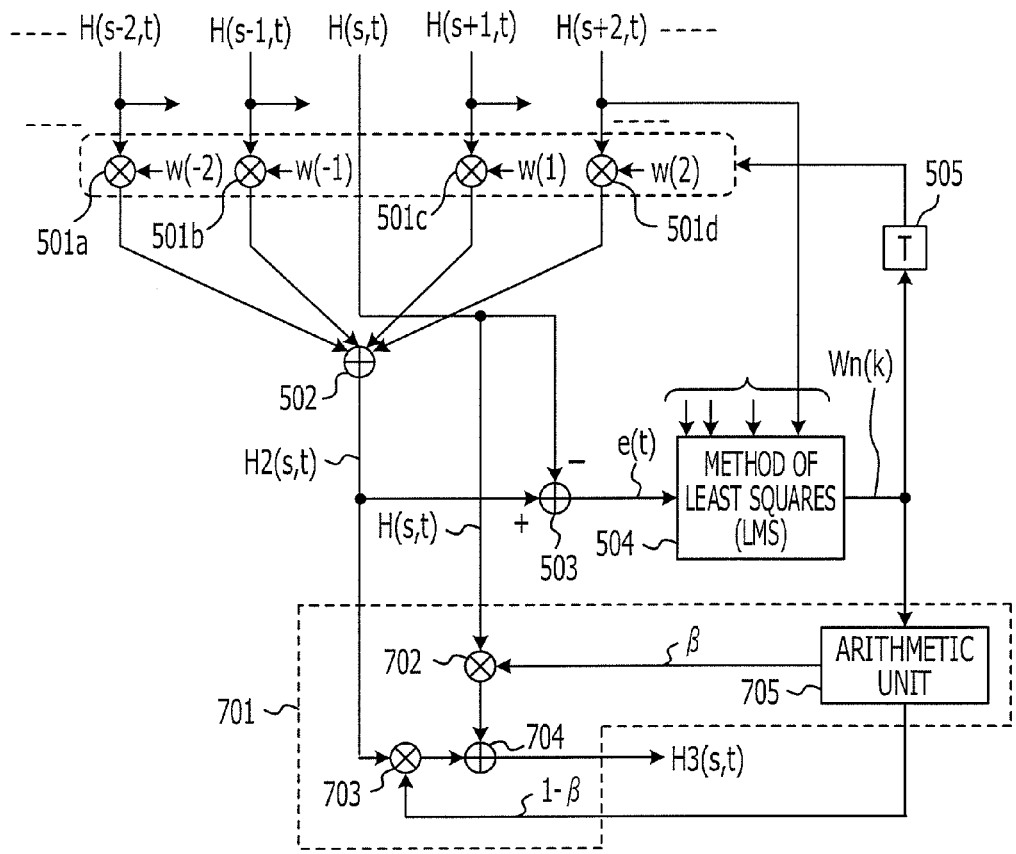
FIGS. 7A and 7B illustrate an example of an adaptive prediction filter.
Figure 7B:
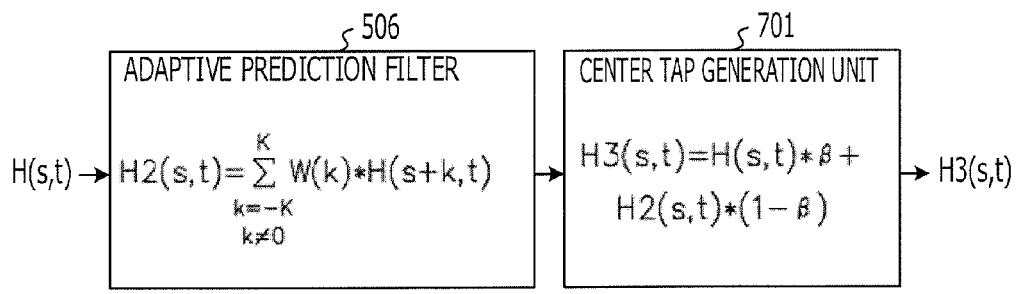

FIGS. 7A and 7B illustrate an example of an adaptive prediction filter. The adaptive prediction filter illustrated in FIGS. 7A and 7B may be the frequency-direction adaptive prediction filter 304 illustrated in FIG. 3. The adaptive prediction filter 304 includes the adaptive prediction filter 506 and a center tap generation unit 701. The propagation path estimated values H(s+k, t) $\{-K<k<K\}$ may be input, and a propagation path estimated value H3(s, t) from which noise has been reduced may be output. In the adaptive prediction filter 304 illustrated in FIGS. 7A and 7B, the center tap generation unit 701 is added to the adaptive prediction filter 506 illustrated in FIGS. 5A and 5B. The center tap generation unit 701 includes a second multiplier 702, a third multiplier 703, a second adder 704, and an arithmetic unit 705. The second multiplier 702 multiplies the propagation path estimated value H(s, t) of the center tap by a first coefficient β. The third multiplier 703 multiplies the output value H2(s, t) of the first adder 502 by a second coefficient 1−β. The arithmetic unit 705 generates the first coefficient β and the second coefficient 1−β based on the filtering coefficients Wn(k). The third adder 704 adds an output value of the second multiplier 702 and an output value of the third multiplier 703, and outputs the propagation path estimated value H3 in which noise has been reduced.

As illustrated in FIG. 7B, the center tap generation unit 701 receives the output value H2(s, t) of the adaptive prediction filter 506 and the propagation path estimated value H(s, t) of the center tap, and outputs the propagation path estimated value H3(s, t) based on the following expression (3) using the first coefficient β and the second coefficient 1−β.

$$H3(s,t)=H(s,t)\beta+H2(s,t)(1-\beta) \quad (3)$$

The arithmetic unit 705 generates the first coefficient β and the second coefficient 1−β. The first coefficient β may be a value proportional to the filtering coefficient W(0) of the center tap. The arithmetic unit 705 generates the first coefficient β and the second coefficient 1−β based on β=W(0)/{1−W(0)}. The filtering coefficient W(0) of the center tap might be optimized, thereby reducing noise.

The filtering coefficient W(0) of the center tap is generated. The arithmetic unit 705 generates the filtering coefficient W(0) of the center tap using the filtering coefficients Wn(k) $\{-K<k<K, k\neq 0\}$ of the taps other than the center tap generated by the filtering coefficient generation unit 504. For example, the arithmetic unit 705 obtains absolute values of the filtering coefficients { . . . , Wn(−2), Wn(−1), Wn(1), Wn(2), . . . } of some taps adjacent to the center tap. The filtering coefficient W(0) of the center tap is generated by performing an interpolation process on the absolute values.

For example, the arithmetic unit 705 generates the filtering coefficient W(0) of the center tap based on an average W_amp (±1) of the absolute values of the filtering coefficients Wn(1) and Wn(−1) of the two taps adjacent to the center tap on both sides of the center tap as represented by the following expression (4). R1 denotes an interpolation coefficient.

$$W\_amp(\pm 1) = \{|Wn(1)| + |Wn(-1)|\}/2$$

$$W(0) = W\_amp(\pm 1) \times R1 \quad (4)$$

Alternatively, the arithmetic unit 705 may generate the filtering coefficient W(0) of the center tap by calculating an average W_amp(±2) of the absolute values of the filtering coefficients Wn(2) and Wn(−2) based on the filtering coefficients Wn(−2), Wn(−1), Wn(1), and Wn(2) of the four taps adjacent to the center tap on both sides of the center tap as represented by the following expression (5). R2 denotes an interpolation coefficient.

$$W\_amp(\pm 2) = \{|Wn(2)| + |Wn(-2)|\}/2$$

$$W(0) = W\_amp(\pm 1) \times R1 + W\_amp(\pm 2) \times R2 \quad (5)$$

The interpolation coefficients R1 and R2 may be set in accordance with conditions such as multipath and fading in the propagation path. For example, the arithmetic unit 705 calculates the interpolation coefficients R1 and R2 in accordance with the amount of delay in the path due to multipath, the number of paths caused by multipath, or a signal-to-interference-and-noise-power ratio (SINR). For example, when the amount of delay in the path due to multipath is large, the arithmetic unit 705 increases the interpolation coefficient R1 and decreases the interpolation coefficient R2. When the number of paths caused by multipath is large, the arithmetic unit 705 increases the interpolation coefficient R1 and decreases the interpolation coefficient R2. When the SINR is large (when noise is small), the arithmetic unit 705 increases the interpolation coefficient R1 and decreases the interpolation coefficient R2.

Figures 8A, 8B:
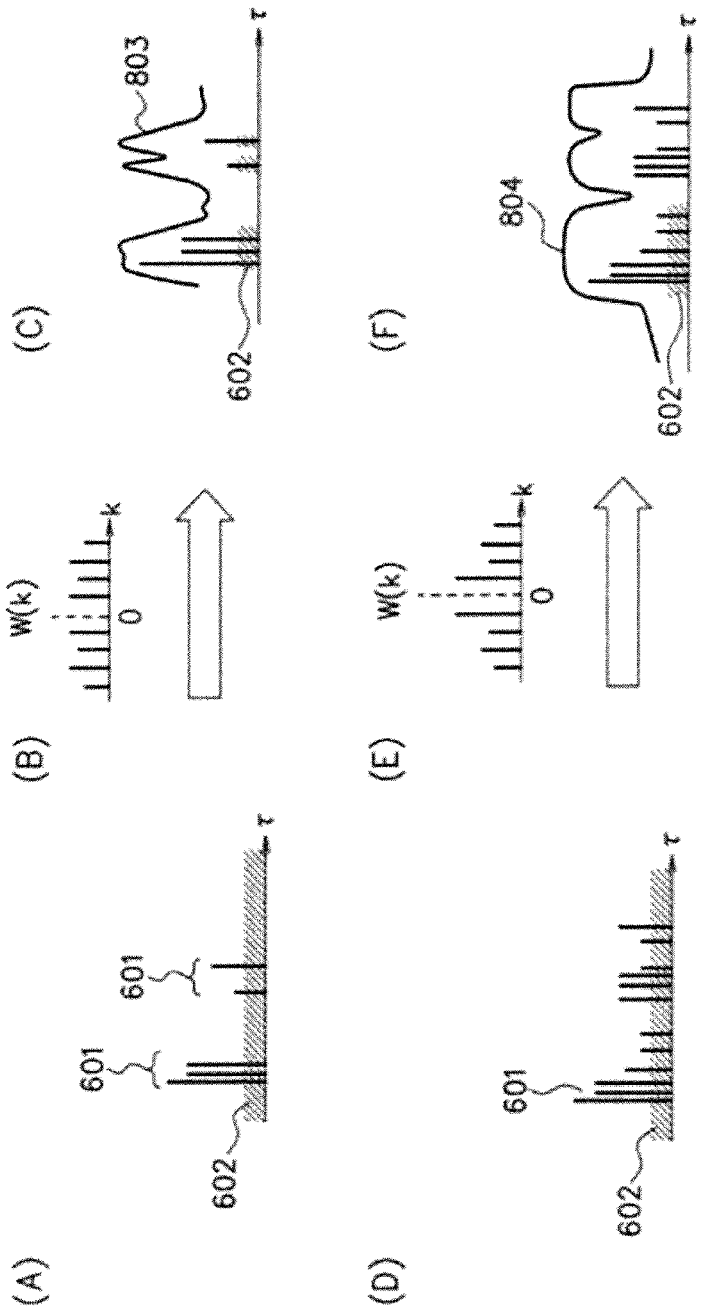
FIGS. 8A and 8B illustrate examples of a path profile.

FIGS. 8A and 8B illustrate examples of a path profile. Part (A) of FIG. 8A may correspond to part (A) of FIG. 6A and illustrates the path profile of input propagation path estimated values H(s, t). Paths 601 and noise 602 are illustrated. Part (B) of FIG. 8A illustrates filtering coefficients W(k). The filtering coefficients W(k) include the filtering coefficients W(k) of the taps including the filtering coefficient W(0) of the center tap. Part (C) of FIG. 8B illustrates the path profile of an output propagation path estimated value H3(s, t). A filtering characteristic curve 803 in which the noise 602 has been reduced is obtained.

Parts (D) to (F) of FIG. 8B may correspond to parts (D) to (F), respectively, of FIG. 6B and illustrate an example of a filter used in a multipath environment, in which delay and the number of waves are large. Part (D) of FIG. 8B illustrates the path profile of input propagation path estimated values H(s, t), which include paths 601 through which a large number of waves propagate and noise 602. Part (E) of FIG. 8B illustrates filtering coefficients W(k). The filtering coefficients W(k) include the filtering coefficients W(k) of the taps including the filtering coefficient W(0) of the center tap. Part (F) of FIG. 8B illustrates the path profile of an output propagation path estimated value H3(s, t). Since filtering is performed using the filtering coefficient W(0) of the center tap, a filtering characteristic curve 804 in which the noise 602 has been reduced may be obtained even in the multipath environment, in which the number of waves is large. Therefore, the propagation path estimation unit 108 might accurately generate the propagation path estimated values Hopt(s, t). The propagation path compensation unit 109 might be able to improve the accuracy of compensation of propagation path distortion in the received signal Z(s, t). The demodulation processing unit 110 might be able to reduce decision errors of data.

With respect to the propagation path estimated values at both ends in the frequency direction, the input signal H(s, t) may be directly used as the output signal Hopt(s, t) while assuming that Hopt(s, t)=H(s, t), and an adaptive prediction filter including a small number of taps may be used.

The time-direction adaptive prediction filter 305 illustrated in FIG. 3 may have a configuration that is substantially the same as or similar to that of the frequency-direction adaptive prediction filter 304. As an input signal, propagation path estimated values H(s, t+j) {−J<j<J} in the time direction may be input instead of the propagation path estimated values H(s+k, t) {−K<k<K, k≠0}. Both the frequency-direction adaptive prediction filter 304 and the time-direction adaptive prediction filter 305 may be provided, or either the frequency-direction adaptive prediction filter 304 or the time-direction adaptive prediction filter 305 may be provided.

Figure 9:
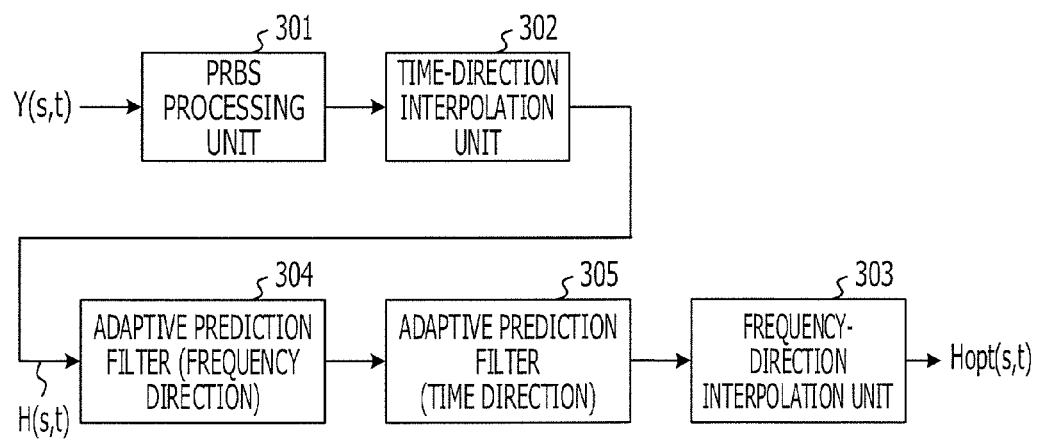
FIG. 9 illustrates an example of a propagation path estimation unit.
Figure 10:
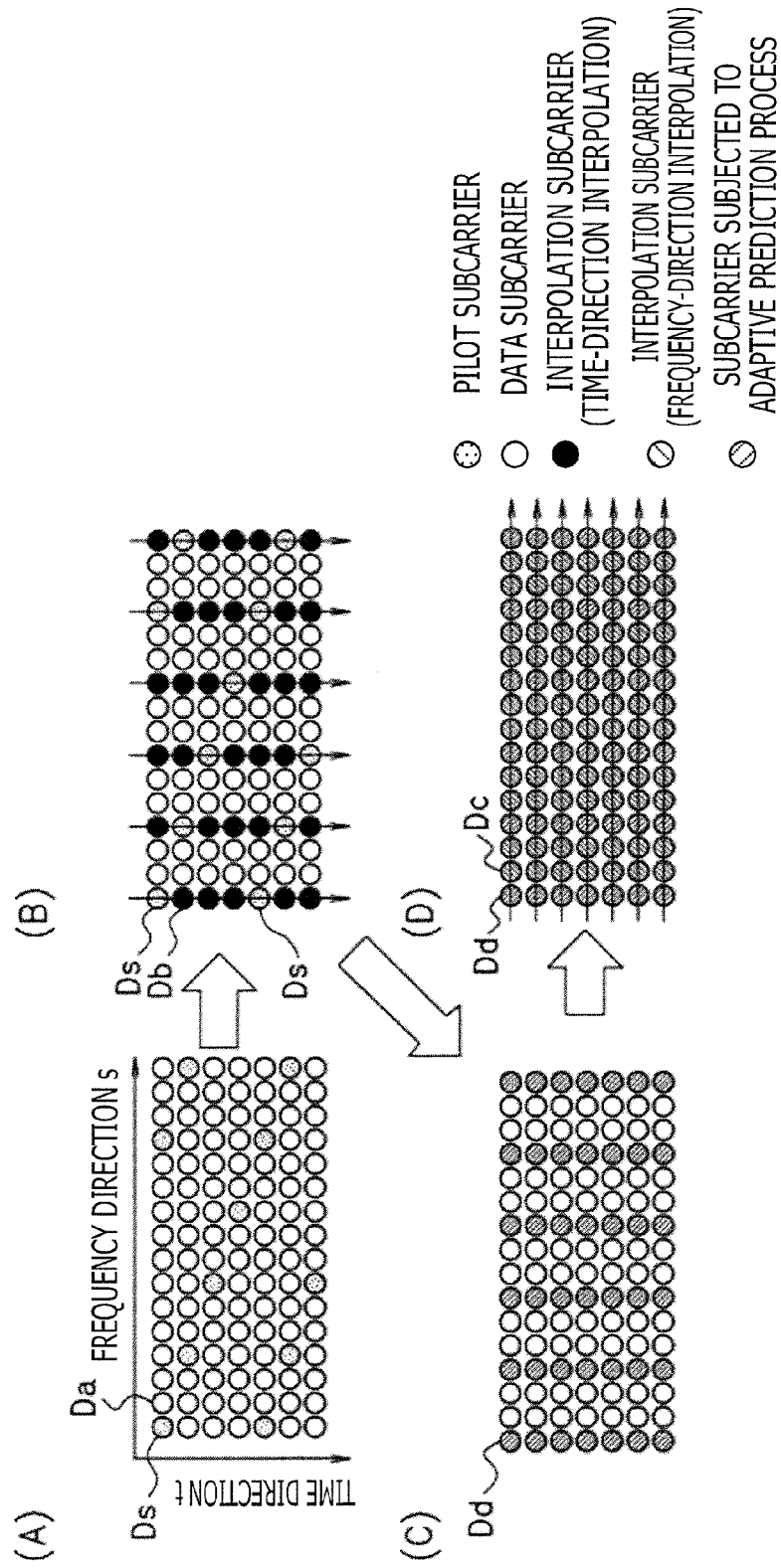
FIG. 10 illustrates an example of a process of a propagation path estimation unit.

FIG. 9 illustrates an example of a propagation path estimation unit. The propagation path estimation unit illustrated in FIG. 9 may be the propagation path estimation unit 108 illustrated in FIG. 1. FIG. 10 illustrates an example of a process of a propagation path estimation unit. The propagation path estimation unit 108 illustrated in FIG. 9 may execute the process illustrated in FIG. 10. In the propagation path estimation unit 108 illustrated in FIG. 9, the position of a frequency-direction interpolation unit 303 is changed from that of the frequency-direction interpolation unit 303 in the propagation path estimation unit 108 illustrated in FIG. 3. The frequency-direction interpolation unit 303 may be provided at a subsequent stage of the time-direction adaptive prediction filter 305. In FIG. 9, other components are substantially the same as or similar to those illustrated in FIG. 3, and accordingly description thereof might be omitted or reduced.

A PRBS processing unit 301 calculates Y(s, t)/X(s, t) based on a received signal Y(s, t) including pilot subcarriers Ds and a known signal X(s, t) including pilot subcarriers Ds, and, as illustrated in part (A) of FIG. 10, outputs propagation path estimated values of the positions of the pilot subcarriers Ds.

A time-direction interpolation unit 302 interpolates the propagation path estimated values of the positions of the pilot subcarriers Ds in the time direction, and, as illustrated in part (B) of FIG. 10, calculates propagation path estimated values H(s, t) of the positions of time-direction interpolation subcarriers Db.

A frequency-direction adaptive prediction filter 304 filters the propagation path estimated values H(s, t) illustrated in part (B) of FIG. 10 in the frequency direction, and outputs propagation path estimated values. For example, in part (B) of FIG. 10, since the interpolation subcarriers Db are disposed at intervals of three subcarriers in the frequency direction, the propagation path estimated values H(s, t) may be input to the frequency-direction adaptive prediction filter 304 at intervals of a multiple of three {s=3n}.

The time-direction adaptive prediction filter 305 filters the propagation path estimated values output from the frequency-direction adaptive prediction filter 304 in the time direction, and, as illustrated in part (C) of FIG. 10, outputs propagation path estimated values of the positions of subcarriers Dd subjected to adaptive prediction.

The frequency-direction interpolation unit 303 interpolates the propagation path estimated values illustrated in part (C) of FIG. 10 in the frequency direction, and then, as illustrated in part (D) of FIG. 10, calculates propagation path estimated values of the positions of frequency-direction interpolation subcarriers Dc and outputs propagation path estimated values Hopt(s, t).

In FIGS. 9 and 10, as with FIGS. 3 and 4, filtering is performed using a filtering coefficient W(0) of a center tap.

Even in a multipath environment, in which the number of waves is large, the propagation path estimated values Hopt(s, t) might be accurately generated and the accuracy of compensation of propagation path distortion in a received signal Z(s, t) might improve.

An inverse modulation processing unit 111 illustrated in FIG. 1 generates propagation path estimated values H1($s, t$) by dividing the received signal Z(s, t) output from the symbol buffer 106 by the values X1($s, t$) determined by the demodulation processing unit 110 as represented by the following expression (6):

$$H1(s,t) = Z(s,t)/X1(s,t) \quad (6)$$

The propagation path estimation unit 108 outputs the propagation path estimated values Hopt(s, t) in which noise has been reduced based on the propagation path estimated values H1($s, t$) to the propagation path compensation unit 109.

Figure 11:
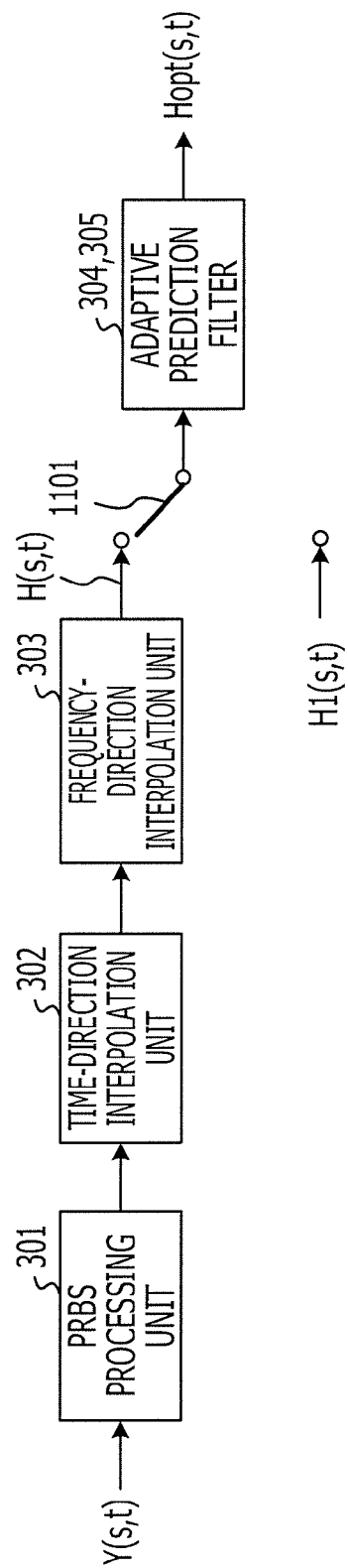
FIG. 11 illustrates an example of a propagation path estimation unit.

FIG. 11 illustrates an example of a propagation path estimation unit. The propagation path estimation unit illustrated in FIG. 11 may be the propagation path estimation unit 108 illustrated in FIG. 1. The propagation path estimation unit 108 illustrated in FIG. 11 is obtained by adding a switch 1101 to the propagation path estimation unit 108 illustrated in FIG. 3. The switch 1101 selectively outputs the propagation path estimated values H(s, t) output from the frequency-direction interpolation unit 303 or the propagation path estimated values H1($s, t$) to the adaptive prediction filters 304 and 305. The propagation path estimated values H1($s, t$) may be generated by the inverse modulation processing unit 111 illustrated in FIG. 1.

In an initial process, the switch 1101 is coupled to an output terminal of the frequency-direction interpolation unit 303. As with FIG. 3, the adaptive prediction filters 304 and 305 receive the propagation path estimated values H(s, t) output from the frequency-direction interpolation unit 303, and output the propagation path estimated values Hopt(s, t). In FIG. 1, the propagation path compensation unit 109 generates the received signal X(s, t) in which propagation path distortion has been compensated by dividing the received signal Z(s, t) by the propagation path estimated values Hopt(s, t). The demodulation processing unit 110 determines the received signal X(s, t), and outputs the determined values X1($s, t$). The inverse modulation processing unit 111 generates the propagation path estimated values H1($s, t$) by dividing the received signal Z(s, t) by the determined values X1($s, t$).

In a second and subsequent processes, the switch 1101 is coupled to an output terminal of the inverse modulation processing unit 111 illustrated in FIG. 1. The adaptive prediction filters 304 and 305 receive the propagation path estimated values H1($s, t$) output from the inverse modulation processing unit 111, and outputs the propagation path estimated values Hopt(s, t). In FIG. 1, the propagation path compensation unit 109 generates the received signal X(s, t) in which propagation path distortion has been compensated by dividing the received signal Z(s, t) by the propagation path estimated values Hopt(s, t). The demodulation processing unit 110 determines the received signal X(s, t), and outputs the determined values X1($s, t$).

In the second and subsequent processes, since the propagation path estimated values H1($s, t$) generated by the inverse modulation processing unit 111 are fed back to the propagation path estimation unit 108 and pass through the adaptive prediction filters 304 and 305 again, the accuracy of the estimation of the propagation path estimated values might improve.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

In various aspects, the systems, apparatuses and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions.

What is claimed is:

1. A receiver apparatus comprising:
   a Fourier transform unit configured to output a converted signal obtained by converting a received signal from a time domain into a frequency domain;
   a propagation path estimation unit configured to calculate a plurality of propagation path estimated values based on pilot subcarriers included in the converted signal; and
   a propagation path compensation unit, including a filter that filters the plurality of propagation path estimated values, configured to compensate propagation path distortion in the converted signal,
   wherein the filter includes:
   a plurality of first multipliers configured to multiply the plurality of propagation path estimated values corresponding to a plurality of taps other than a center tap, respectively, by a plurality of filtering coefficients;
   a first adder configured to add output values of the plurality of first multipliers;
   a first subtractor configured to calculate an error between an output value of the first adder and a propagation path estimated value corresponding to the center tap;
   a filtering coefficient generation unit configured to generate the filtering coefficients based on the error;
   a second multiplier configured to multiply the propagation path estimated value corresponding to the center tap by a first coefficient;
   a third multiplier configured to multiply the output value of the first adder by a second coefficient; and
   a second adder configured to add an output value of the second multiplier and an output value of the third multiplier.

2. The receiver apparatus of claim 1, further comprising:
   an arithmetic unit configured to calculate the first coefficient and the second coefficient using filtering coefficients of at least two taps, each of which is adjacent to the center tap and is positioned on one of both sides of the center tap.

3. The receiver apparatus of claim 2,
   wherein the arithmetic unit calculates the first coefficient and the second coefficient in accordance with an amount of delay in a path due to multipath, the number of paths caused by the multipath, or a signal-to-interference-and-noise-power ratio.

4. The receiver apparatus of claim 1,
wherein the filter performs filtering in a frequency direction or filtering in a time direction.

5. The receiver apparatus of claim 1,
wherein the filter performs filtering in a frequency direction and filtering in a time direction.

6. The receiver apparatus of claim 1,
wherein the propagation path estimation unit includes:
a time-direction interpolation unit configured to interpolate the plurality of propagation path estimated values in a time direction; and
a frequency-direction interpolation unit configured to interpolate the plurality of propagation path estimated values in a frequency direction.

7. The receiver apparatus of claim 1, further comprising:
an inverse modulation processing unit configured to calculate the plurality of propagation path estimated values based on an output signal of the propagation path compensation unit and the converted signal,
wherein the filter is configured to filter the plurality of propagation path estimated values calculated via the inverse modulation processing unit.

8. A method for processing a received signal, the method comprising:
converting the received signal from a time domain into a frequency domain to output a converted signal;
calculating a plurality of propagation path estimated values based on pilot subcarriers included in the converted signal; and
filtering the plurality of propagation path estimated values to compensate propagation path distortion in the converted signal,
wherein the filtering further includes:
multiplying the plurality of propagation path estimated values corresponding to a plurality of taps other than a center tap, respectively, by a plurality of filtering coefficients;
adding output values of the plurality of first multipliers;
calculating an error between an output value of the first adder and a propagation path estimated value corresponding to the center tap;
generating the filtering coefficients based on the error;
multiplying the propagation path estimated value corresponding to the center tap by a first coefficient;
multiplying the output value of the first adder by a second coefficient; and
adding an output value of the second multiplier and an output value of the third multiplier.

9. The method of claim 8, further comprising:
calculating the first coefficient and the second coefficient using filtering coefficients of at least two taps each of which is adjacent to the center tap and is positioned on one of both sides of the center tap.

10. The method of claim 9,
wherein calculating the first coefficient and the second coefficient in accordance with an amount of delay in a path due to multipath, the number of paths caused by the multipath, or a signal-to-interference-and-noise-power ratio.

11. The method of claim 8,
wherein the filtering is in a frequency direction or filtering in a time direction.

12. The method of claim 8,
wherein the filtering is in a frequency direction and filtering in a time direction.

13. The method of claim 8,
wherein calculating the plurality of propagation path estimated values includes:
interpolating the plurality of propagation path estimated values in a time direction; and
interpolating the plurality of propagation path estimated values in a frequency direction.

14. The method of claim 8, further comprising:
calculating the plurality of propagation path estimated values based on the compensated propagation path and the converted signal, and
filtering the plurality of propagation path estimated values.

15. A computer program product stored in a non-transitory computer readable medium, the computer program product includes computer executable instructions for processing a received signal, including instruction for:
converting the received signal from a time domain into a frequency domain to output a converted signal;
calculating a plurality of propagation path estimated values based on pilot subcarriers included in the converted signal; and
filtering the plurality of propagation path estimated values to compensate propagation path distortion in the converted signal,
wherein the filtering further includes:
multiplying the plurality of propagation path estimated values corresponding to a plurality of taps other than a center tap, respectively, by a plurality of filtering coefficients;
adding output values of the plurality of first multipliers;
calculating an error between an output value of the first adder and a propagation path estimated value corresponding to the center tap;
generating the filtering coefficients based on the error;
multiplying the propagation path estimated value corresponding to the center tap by a first coefficient;
multiplying the output value of the first adder by a second coefficient; and
adding an output value of the second multiplier and an output value of the third multiplier.

16. The computer program product of claim 15, further comprising instructions for:
calculating the first coefficient and the second coefficient using filtering coefficients of at least two taps each of which is adjacent to the center tap and is positioned on one of both sides of the center tap.

17. The computer program product of claim 15, wherein the filtering is selected in one from a group consisting of a frequency direction and in a time direction.

18. The computer program product of claim 15, wherein the filtering is in a frequency direction and in a time direction.

19. The computer program product of claim 15, wherein the instructions for calculating the plurality of propagation path estimated values include instructions for:
interpolating the plurality of propagation path estimated values in a time direction; and
interpolating the plurality of propagation path estimated values in a frequency direction.

20. The computer program product of claim 15, further comprising instructions for:
calculating the plurality of propagation path estimated values based on the compensated propagation path and the converted signal, and
filtering the plurality of propagation path estimated values.

* * * * *